(12) United States Patent
Kudo et al.

(10) Patent No.: US 7,144,628 B2
(45) Date of Patent: Dec. 5, 2006

(54) SPHERICAL SILICA-TITANIA-BASED FINE PARTICLES SURFACE-TREATED WITH SILANE, PRODUCTION PROCESS THEREFOR, AND EXTERNAL ADDITIVE FOR ELECTROSTATICALLY CHARGED IMAGE DEVELOPING TONER USING SAME

(75) Inventors: Muneo Kudo, Annaka (JP); Masaaki Yamaya, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 246 days.

(21) Appl. No.: 10/829,198

(22) Filed: Apr. 22, 2004

(65) Prior Publication Data

US 2004/0229040 A1 Nov. 18, 2004

(30) Foreign Application Priority Data

May 13, 2003 (JP) .............................. 2003-134393

(51) Int. Cl.
| | |
|---|---|
| *C09C 1/30* | (2006.01) |
| *B32B 5/16* | (2006.01) |
| *C01B 33/18* | (2006.01) |
| *C08K 3/22* | (2006.01) |
| *C08K 3/36* | (2006.01) |
| *G03G 9/08* | (2006.01) |
| *G03G 9/097* | (2006.01) |

(52) U.S. Cl. ...................... 428/405; 106/445; 106/446; 106/482; 106/490; 427/291; 430/108.3; 430/108.6

(58) Field of Classification Search ................ 106/446, 106/481, 445, 482, 490; 428/405; 430/108.3, 430/108.6; 427/291
See application file for complete search history.

(56) References Cited

U.S. PATENT DOCUMENTS

| 3,720,617 | A | 3/1973 | Chatterji et al. |
|---|---|---|---|
| 4,567,030 | A | 1/1986 | Yuasa et al. |
| 6,270,937 | B1 * | 8/2001 | Yuasa et al. ............. 430/108.7 |
| 6,432,599 | B1 * | 8/2002 | Yuasa et al. ............. 430/108.4 |
| 6,551,567 | B1 * | 4/2003 | Konya et al. ............... 423/337 |
| 2003/0044706 | A1 * | 3/2003 | Konya et al. ............ 430/108.6 |
| 2003/0059700 | A1 | 3/2003 | Konya et al. |

FOREIGN PATENT DOCUMENTS

| EP | 1 035 450 A2 | 9/2000 |
|---|---|---|
| GB | 1 402 009 | 8/1975 |
| GB | 1 420 010 | 8/1975 |
| JP | 46-5782 | 12/1971 |
| JP | 48-47345 | 7/1973 |
| JP | 48-47346 | 7/1973 |
| JP | 1-38043 | 8/1986 |

* cited by examiner

*Primary Examiner*—Anthony J. Green
(74) *Attorney, Agent, or Firm*—Oblon, Spivak, McClelland, Maier & Neustadt, P.C.

(57) ABSTRACT

Spherical silica-titania-based fine particles surface-treated with silane are provided. The fine particles have a titanium atom content of 0.001 to 5% by weight, a frictional electrification with iron powder of −100 to −300 μC/g, a bulk density of 0.2 to 0.4 g/ml, and a particle diameter of 0.01 to 5 μm. The particles are useful as a material for an external additive for an electrostatically charged image developing toner. The toner is unlikely to cause degeneration or scratching of organic photoreceptors, displays excellent dispersibility and favorable flowability and consequently does not cause adhesion to the photoreceptor.

20 Claims, No Drawings

SPHERICAL SILICA-TITANIA-BASED FINE PARTICLES SURFACE-TREATED WITH SILANE, PRODUCTION PROCESS THEREFOR, AND EXTERNAL ADDITIVE FOR ELECTROSTATICALLY CHARGED IMAGE DEVELOPING TONER USING SAME

BACKGROUND OF THE INVENTION

1. Field of the Invention

The present invention relates to spherical silica-titania-based fine particles that have been surface-treated with silane, and more particularly to spherical silica-titania-based fine particles surface-treated with silane which display superior dispersibility and low levels of aggregation. In addition, the present invention also relates to an external additive for a fine particle toner used for improving image quality.

2. Description of the Prior Art

Dry developers used in electrophotographic techniques and the like can be broadly classified into one-component developers that use solely a toner comprising a colorant dispersed within a binder resin, and two-component developers comprising a carrier mixed with the toner. When a copy operation is conducted using one of these developers, in order to achieve the required level of process compatibility the developer must display excellent levels of flowability, caking resistance, fixation, electrostatic chargeability, and cleanability. Inorganic fine particles are frequently added to the toner to improve the levels of flowability, caking resistance, fixation, and cleanability. However, the dispersibility of the inorganic particles has a large effect on the characteristics of the toner, and if the dispersibility is non-uniform, then the desired levels of flowability, caking resistance and fixation may not be achievable, and the level of cleanability may also deteriorate, causing toner adhesion to the photoreceptor and the appearance of black spot image defects. In order to resolve these types of problems, a variety of products have been proposed in which the surface of the inorganic fine particles has been subjected to hydrophobic treatment (see patent reference 1, patent reference 2, patent reference 3).

However, in those cases where either organic photoreceptors or finer particle toners are used to further improve image quality, the types of inorganic fine particles described above do not produce satisfactory levels of performance. The surface of organic photoreceptors is softer than that of inorganic photoreceptors and the reactivity is also higher, meaning organic photoreceptors are prone to reduced lifespans. Accordingly, when this type of organic photoreceptor is used, the inorganic fine particles added to the toner can cause degeneration or scratching of the photoreceptor. Furthermore when fine particle toners are used, because the powder flowability is poorer than that displayed by toners of a more conventional particle size, larger quantities of inorganic fine particles must be added, and these inorganic particles increase the likelihood of toner adhesion to the photoreceptor.

Accordingly, a process has been proposed which uses a specific silane treatment process for performing a hydrophobization of hydrophilic spherical silica fine particles produced by hydrolysis of an alkoxysilane (see patent reference 4). However, the level of electrostatic charging of the silica fine particles produced by this process is low, and even if used as a toner external additive, the particles are unable to impart the required level of electrostatic charge to the toner.

Furthermore, spherical silica-titania fine particles produced by the hydrolysis of metal alkoxides have been reported as composite inorganic oxides (see patent reference 5). However, these spherical silica-titania fine particles have a hydrophilic surface and consequently display inadequate dispersibility, and also display a large variation in the level of electrostatic charging depending on the environment.

[Patent Reference 1]
Japanese Laid-open publication (kokai) No. Sho 46-5782
[Patent Reference 2]
Japanese Laid-open publication (kokai) No. Sho 48-47345
[Patent Reference 3]
Japanese Laid-open publication (kokai) No. Sho 48-47346
[Patent Reference 4]
Japanese Laid-open publication (kokai) No. 2000-330328
[Patent Reference 5]
Japanese Post-Examination Patent publication (kokoku) No. Hei 1-38043

SUMMARY OF THE INVENTION

An object of the present invention is to provide a toner external additive comprising spherical silica-titania-based fine particles surface-treated with silane, which undergoes no reaction or interaction with organic photoreceptors and is consequently unlikely to cause degeneration or scratching of such photoreceptors, displays excellent dispersibility and favorable flowability and consequently does not cause toner adhesion to the photoreceptor, is capable of imparting the required level of electrostatic charge to the toner, and displays an electrostatic chargeability that is independent of the environment.

Furthermore, another object of the present invention is to provide the aforementioned spherical silica-titania-based fine particles surface-treated with silane, which are useful in the production of the aforementioned toner external additive, and a production process for those particles.

In order to achieve the objects described above, the present invention provides spherical silica-titania-based fine particles surface-treated with silane, wherein the titanium atom content of the particles is within a range from 0.001 to 5% by weight, the frictional electrification with iron powder is within a range from −100 to −300 µC/g, the bulk density is within a range from 0.2 to 0.4 g/ml, and the particle diameter is within a range from 0.01 to 5 µm.

Furthermore, the present invention also provides a production process for the spherical silica-titania-based fine particles surface-treated with silane, comprising the steps of (A) producing hydrophobic spherical silica-titania fine particles by introducing $R^5SiO_{3/2}$ units [wherein, $R^5$ represents a substituted or unsubstituted monovalent hydrocarbon group of 1 to 20 carbon atoms] onto the surface of hydrophilic spherical silica-titania fine particles comprising $SiO_2$ units and $TiO_2$ units, and (B) introducing $R^7{}_3SiO_{1/2}$ units [wherein, the $R^7$ groups are either identical or different, and each represent a substituted or unsubstituted monovalent hydrocarbon group of 1 to 6 carbon atoms] onto the surface of the produced hydrophobic spherical silica-titania fine particles.

In addition, the present invention also provides an external additive for an electrostatically charged image developing toner comprising the aforementioned spherical silica-titania-based fine particles surface-treated with silane.

By using spherical silica-titania-based fine particles surface-treated with silane according to the present invention, a toner external additive comprising these spherical silica-titania-based fine particles surface-treated with silane can be produced, which undergoes no reaction or interaction with organic photoreceptors and is consequently unlikely to cause degeneration or scratching of such photoreceptors, displays excellent dispersibility and favorable flowability and consequently does not cause toner adhesion to the photoreceptor, is capable of imparting the required level of electrostatic charge to the toner, and displays an electrostatic chargeability that is independent of the environment.

Furthermore, by applying this toner external additive to electrostatically charged image development in electrophotographic techniques or electrostatic recording techniques or the like, an increase in image quality can be expected.

DETAILED DESCRIPTION OF THE PREFERRED EMBODIMENTS

As follows is a more detailed description of the present invention.

<Synthesis of Spherical Silica-Titania-based Fine Particles Surface-Treated with Silane>

First is a detailed description of the production process for the spherical silica-titania-based fine particles that have been surface-treated with silane according to the present invention. These spherical silica-titania-based fine particles surface-treated with silane are produced using hydrophilic spherical silica-titania fine particles as the starting material, by a process that comprises a step for conducting a hydrophobization treatment of the surface of these hydrophilic spherical silica-titania fine particles (step (A)), and a step for conducting a triorganosilylation treatment of the surface of the thus obtained hydrophobic spherical silica-titania fine particles (step (B)).

Synthesis of Hydrophilic Spherical Silica-Titania Fine Particles

In the present invention, there are no particular restrictions on the hydrophilic spherical silica-titania fine particles used as the starting material for the step (A), and these particles can be produced, for example, by hydrolyzing and condensing a mixture of:

a tetrafunctional silane compound represented by a general formula (1):

$$Si(OR^1)_4 \quad (1)$$

[wherein, the $R^1$ groups are either identical or different, and each represent a monovalent hydrocarbon group of 1 to 6 carbon atoms], or a partial hydrolysis-condensation product thereof, or a mixture of the two; and a tetrafunctional titanium compound represented by a general formula (2):

$$TiR^3_p(OR^2)_{4-p} \quad (2)$$

[wherein, the $R^2$ groups are either identical or different, and each represent a monovalent hydrocarbon group of 1 to 20 carbon atoms, $R^3$ is either an enol residue of a β-diketone represented by a general formula (2-a):

(2-a)

(wherein, R and R' are either identical or different, and each represent a monovalent hydrocarbon group of 1 to 6 carbon atoms), or an enol residue of a β-ketoester represented by a general formula (2-b):

(2-b)

(wherein, R and R' are either identical or different, and are each as defined above), and p is an integer of 0 to 2] in a mixed liquid of water and a hydrophilic organic solvent in the presence of a basic material. In this process, the hydrophilic spherical silica-titania fine particles are obtained as a mixed solvent dispersion in water and the hydrophilic organic solvent. As described below, where necessary an aqueous dispersion of the hydrophilic spherical silica-titania fine particles can also be prepared by replacing the dispersion medium of the mixed solvent dispersion of the hydrophilic spherical silica-titania fine particles with water.

In the general formula (1) above, $R^1$ is preferably a monovalent hydrocarbon group of 1 to 4 carbon atoms, and even more preferably of 1 to 2 carbon atoms. Examples of the monovalent hydrocarbon groups represented by $R^1$ include methyl groups, ethyl groups, propyl groups, butyl groups and phenyl groups, although methyl groups, ethyl groups, propyl groups and butyl groups are preferred, and methyl groups and ethyl groups are particularly desirable.

Specific examples of the tetrafunctional silane compound represented by the general formula (1) include tetraalkoxysilanes such as tetramethoxysilane, tetraethoxysilane, tetraisopropoxysilane and tetrabutoxysilane, as well as tetraphenoxysilane, and of these, tetramethoxysilane, tetraethoxysilane, tetraisopropoxysilane and tetrabutoxysilane are preferred, and tetramethoxysilane and tetraethoxysilane are particularly desirable. Furthermore, examples of partial hydrolysis-condensation products of the tetrafunctional silane compound represented by the general formula (1) include methyl silicates and ethyl silicates.

In the general formula (2) above, $R^2$ is preferably a monovalent hydrocarbon group of 3 to 4 carbon atoms, and even more preferably of 3 carbon atoms. Examples of the monovalent hydrocarbon groups represented by $R^2$ include methyl groups, ethyl groups, propyl groups, isopropyl groups, butyl groups, 2-ethylhexyl groups, nonyl groups, octadecyl groups and isopropenyl groups, although isopropyl groups and butyl groups are preferred, and isopropyl groups are particularly desirable.

Examples of the monovalent hydrocarbon groups of 1 to 6 carbon atoms represented by R and R' in the general formulas (2-a) and (2-b), which in turn represent the group $R^3$ in the general formula (2), include methyl groups, ethyl groups, n-propyl groups, isopropyl groups, butyl groups and hexyl groups.

Examples of the enol residue of a β-diketone represented by $R^3$ include residues represented by the formulas shown below.

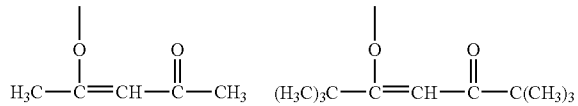

Examples of the enol residue of a β-ketoester include the residue represented by the formula shown below.

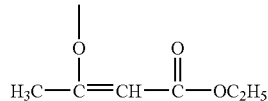

In the general formula (2) above, p is an integer from 0 to 2, and is preferably either 0 or 2.

Specific examples of the tetrafunctional titanium compound represented by the general formula (2) include titanium alkoxides such as titanium tetraisopropoxide, titanium tetrabutoxide, titanium tetrakis(2-ethylhexyloxide), titanium tetranonyloxide, titanium tetrastearyloxide, titanium tetraisopropenoxide, titanium diisopropoxide bis(2,4-pentanedionate), titanium dibutoxide bis(2,4-pentanedionate), titanium diisopropoxide bis(2,2,6,6-tetramethyl-3,5-heptanedionate), and titanium diisopropoxide bis(ethylacetoacetate), and of these, titanium tetraisopropoxide and titanium tetrabutoxide are preferred, and titanium tetraisopropoxide is particularly desirable. In the formulas shown below, $^i$Pr represents an isopropyl group, and Bu represents a butyl group. Titanium diisopropoxide bis(2,4-pentanedionate) has a structure represented by the following formula:

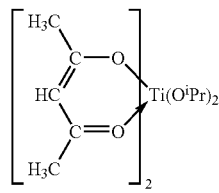

titanium dibutoxide bis(2,4-pentanedionate) has a structure represented by the following formula:

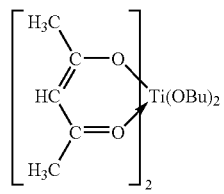

titanium diisopropoxide bis(2,2,6,6-tetramethyl-3,5-heptanedionate) has a structure represented by the following formula:

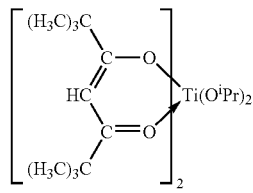

and titanium diisopropoxide bis(ethylacetoacetate) has a structure represented by the formula below.

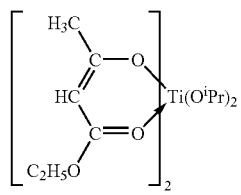

There are no particular restrictions on the aforementioned hydrophilic organic solvent, provided it is capable of dissolving the compound of the general formula (1) or a partial hydrolysis-condensation product thereof, a compound of the general formula (2) and water, and suitable examples include alcohols, cellosolve solvents such as methyl cellosolve, ethyl cellosolve, butyl cellosolve and cellosolve acetate, ketones such as acetone and methyl ethyl ketone, and ethers such as dioxane and tetrahydrofuran, and of these, alcohols and cellosolve solvents are preferred, and alcohols are particularly desirable. Examples of suitable alcohols include those alcohols represented by a general formula (3):

$$R^4OH \qquad (3)$$

[wherein, $R^4$ is a monovalent hydrocarbon group of 1 to 6 carbon atoms].

In the general formula (3) above, $R^4$ is preferably a monovalent hydrocarbon group of 1 to 4 carbon atoms, and even more preferably of 1 to 2 carbon atoms. Specific examples of the alcohol represented by the general formula (3) include methanol, ethanol, isopropanol and butanol. As the number of carbon atoms of the alcohol increases, the particle size of the product spherical silica-titania fine particles also increases. Accordingly, the actual alcohol used is best selected in accordance with the target particle size for the spherical silica-titania fine particles.

Furthermore, examples of the aforementioned basic material include ammonia, dimethylamine and diethylamine, and of these, ammonia and diethylamine are preferred, and ammonia is particularly desirable. The required quantity of the basic material is dissolved in water, and the resulting (basic) aqueous solution is then mixed with the hydrophilic organic solvent.

The quantity of water used at this time is preferably within a range from 0.5 to 5 mols, and more preferably from 0.5 to 2 mols, and even more preferably from 0.6 to 1 mol, per 1 mol of alkoxy groups within the tetrafunctional silane compound of the general formula (1) or the partial hydrolysis-condensation product thereof and the tetrafunctional titanium compound of the general formula (2). The ratio between the water and the hydrophilic organic solvent is preferably a weight ratio within a range from 0.5 to 10, and more preferably from 0.5 to 5, and even more preferably from 1 to 2. The quantity of the basic material is preferably within a range from 0.01 to 5 mols, and more preferably from 0.1 to 3 mols, and even more preferably from 0.5 to 1.5 mols, per 1 mol of alkoxy groups within the silane compound of the general formula (1) or the partial hydrolysis-condensation product thereof and the compound of the general formula (2).

The hydrolysis and condensation of the tetrafunctional silane compound of the general formula (1) and the tetrafunctional titanium compound of the general formula (2) can be conducted using known methods, namely by adding a mixture of the tetrafunctional silane compound of the general formula (1) and the tetrafunctional titanium compound of the general formula (2) to a mixture of the water and hydrophilic organic solvent, said mixture containing the basic material.

The optional step of replacing the dispersion medium of the mixed solvent dispersion of the spherical silica-titania fine particles with water, which is performed as is deemed necessary, can be conducted by adding water to the dispersion and then distilling the hydrophilic organic solvent off (and then repeating this operation if necessary). The quantity of water added during this operation, reported as a weight ratio relative to the combined weight of the hydrophilic organic solvent used and the alcohol generated, is preferably within a range from 0.5 to 2, and more preferably from 0.5 to 1.5, and even more preferably from 0.6 to 1.2.

The hydrophilic spherical silica-titania fine particles produced in this manner are used as the starting material for the step (A). These fine particles may exist as a mixed solvent dispersion comprising hydrophilic spherical silica-titania fine particles, although by adding water to the mixed solvent dispersion of hydrophilic spherical silica-titania fine particles and subsequently distilling the hydrophilic organic solvent off to form an aqueous dispersion, any residual alkoxy groups are completely hydrolyzed, and consequently an aqueous dispersion comprising the hydrophilic spherical silica-titania fine particles is preferred.

Surface Hydrophobization of Hydrophilic Spherical Silica-Titania Fine Particles (Step (A))

The step (A) is used for producing hydrophobic spherical silica-titania fine particles by introducing $R^5SiO_{3/2}$ units [wherein, $R^5$ represents a substituted or unsubstituted monovalent hydrocarbon group of 1 to 20 carbon atoms] onto the surface of the hydrophilic spherical silica-titania fine particles described above. For example, in a preferred form of the step (A), a trifunctional silane compound represented by a general formula (4):

$$R^5Si(OR^6)_3 \quad (4)$$

[wherein $R^5$ is as defined above, and the $R^6$ groups are either identical or different, and each represent a monovalent hydrocarbon group of 1 to 6 carbon atoms], or a partial hydrolysis-condensation product thereof, or a mixture of the two is added to the mixed solvent dispersion or aqueous dispersion comprising the hydrophilic spherical silica-titania fine particles; thereby treating the surface of the hydrophilic spherical silica-titania fine particles and generating hydrophobic spherical silica-titania fine particles.

In the above general formula (4), $R^5$ is preferably a monovalent hydrocarbon group of 1 to 10 carbon atoms, and even more preferably of 1 to 6 carbon atoms. Examples of the monovalent hydrocarbon group represented by $R^5$ include a methyl group, ethyl group, n-propyl group, isopropyl group, butyl group and hexyl group, and of these, a methyl group, ethyl group, n-propyl group or isopropyl group is preferred, and a methyl group or an ethyl group is particularly desirable. Furthermore, either a portion of, or all of, the hydrogen atoms of this monovalent hydrocarbon group may be substituted with halogen atoms such as fluorine atoms, chlorine atoms or bromine atoms, although preferably with fluorine atoms.

$R^6$ is preferably a monovalent hydrocarbon group of 1 to 4 carbon atoms, and even more preferably of 1 to 2 carbon atoms. Examples of the monovalent hydrocarbon groups represented by $R^6$ include methyl groups, ethyl groups, propyl groups and butyl groups, although methyl groups, ethyl groups and propyl groups are preferred, and methyl groups and ethyl groups are particularly desirable.

Specific examples of the trifunctional silane compound represented by the general formula (4) include trialkoxysilanes such as methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, trifluoropropyltrimethoxysilane and heptadecafluorodecyltrimethoxysilane, or partial hydrolysis-condensation products of these compounds.

The quantity of the added trifunctional silane compound represented by the general formula (4) is typically within a range from 0.001 to 1 mol, and preferably from 0.01 to 0.1 mols, and even more preferably from 0.01 to 0.05 mols, per 1 mol of combined $SiO_2$ units and $TiO_2$ units within the hydrophilic spherical silica-titania fine particles.

Surface Triorganosilylation of Hydrophobic Spherical Silica-Titania Fine Particles (Step (B))

The step (B) is used for introducing $R^7_3SiO_{1/2}$ units [wherein, the $R^7$ groups are either identical or different, and each represent a substituted or unsubstituted monovalent hydrocarbon group of 1 to 6 carbon atoms] onto the surface of the hydrophobic spherical silica-titania fine particles obtained in the step (A) described above. For example, in a preferred form of the step (B), the dispersion medium of the aforementioned aqueous dispersion comprising hydrophobic spherical silica-titania fine particles is converted from a mixture of water and a hydrophilic organic solvent such as an alcohol mixture to a ketone-based solvent, thereby generating a ketone-based solvent dispersion of the hydrophobic spherical silica-titania fine particles, and either a silazane compound represented by a general formula (5):

$$R^7_3SiNHSiR^7_3 \quad (5)$$

[wherein, the $R^7$ groups are either identical or different and are as defined above], a monofunctional silane compound represented by a general formula (6):

$$R^7_3SiX \quad (6)$$

[wherein, the $R^7$ groups are either identical or different and are as defined above, and X represents either an OH group or a hydrolysable group], or a mixture of the two is added to the ketone-based solvent dispersion of the hydrophobic spherical silica-titania fine particles, thereby triorganosilylating any residual reactive groups remaining at the surface of the hydrophobic spherical silica-titania fine particles.

In the general formulas (5) and (6), $R^7$ is preferably a monovalent hydrocarbon group of 1 to 3 carbon atoms, and even more preferably of 1 to 2 carbon atoms. Examples of the monovalent hydrocarbon groups represented by $R^7$ include methyl groups, ethyl groups, propyl groups, isopropyl groups and butyl groups, although methyl groups, ethyl groups and propyl groups are preferred, and methyl groups and ethyl groups are particularly desirable. Furthermore, either a portion of, or all of, the hydrogen atoms of these monovalent hydrocarbon groups may be substituted with halogen atoms such as fluorine atoms, chlorine atoms or bromine atoms, although preferably with fluorine atoms.

Examples of the hydrolysable group represented by X include a chlorine atom, an alkoxy group, an amino group or an acyloxy group, and an alkoxy group or an amino group are preferred, and an alkoxy group is particularly desirable.

Converting the dispersion medium of the aqueous dispersion or mixed solvent dispersion comprising the spherical silica-titania fine particles from a mixture of water and a hydrophilic organic solvent such as an alcohol mixture to a ketone-based solvent can be achieved by adding the ketone-based solvent to the dispersion and then distilling the mixture off (and then repeating this operation if necessary).

The quantity of the ketone-based solvent added, reported as a weight ratio relative to the quantity of hydrophilic spherical silica-titania fine particles used, is typically within a range from 0.5 to 5, and preferably from 2 to 5, and even more preferably from 3 to 4. Suitable examples of this ketone-based solvent include methyl ethyl ketone, methyl isobutyl ketone and acetylacetone, although methyl isobutyl ketone is preferred.

Specific examples of the silazane compound represented by the general formula (5) include hexamethyldisilazane and hexaethyldisilazane, and hexamethyldisilazane is preferred. Furthermore, specific examples of the monofunctional silane compound represented by the general formula (6) include monosilanols such as trimethylsilanol and triethylsilanol, monochlorosilanes such as trimethylchlorosilane and triethylchlorosilane, monoalkoxysilanes such as trimethylmethoxysilane and trimethylethoxysilane, monoaminosilanes such as trimethylsilyldimethylamine and trimethylsilyldiethylamine, and monoacyloxysilanes such as trimethylacetoxysilane, although of these, trimethylsilanol, trimethylmethoxysilane and trimethylsilyldiethylamine are preferred, and trimethylsilanol and trimethylmethoxysilane are particularly desirable.

The quantity of the silazane compound, the monofunctional silane compound, or a mixture of the two used is typically within a range from 0.1 to 0.5 mols, and preferably from 0.2 to 0.4 mols, and even more preferably from 0.2 to 0.3 mols, per 1 mol of combined $SiO_2$ units and $TiO_2$ units within the hydrophilic spherical silica-titania fine particles used.

These spherical silica-titania-based fine particles surface-treated with silane may be either produced as a powder using normal methods, or produced as a dispersion by adding an organic compound following the reaction with the silazane compound.

<Characteristics of Spherical Silica-Titania-based Fine Particles Surface-Treated with Silane>

The titanium atom content within fine particles of the present invention is typically within a range from 0.001 to 5% by weight, and preferably from 0.05 to 1% by weight, and even more preferably from 0.06 to 0.8% by weight. If this titanium content is less than 0.001% by weight, then the titanium complexing effect is not adequately realized, whereas if the content exceeds 5% by weight, then the particles tend to aggregate and lose their spherical shape.

The frictional electrification between the above fine particles and iron powder is typically within a range from $-100$ to $-300$ μC/g, and preferably from $-120$ to $-200$ μC/g, and even more preferably from $-140$ to $-180$ μC/g. If this frictional electrification is less than $-100$ μC/g, then negative electrostatic chargeability is poor, and imparting a satisfactory level of electrostatic charge to the toner can become impossible, whereas if the frictional electrification exceeds $-300$ μC/g, then the level of electrostatic charge for a negatively charged toner can become excessive.

The bulk density of the above fine particles is typically within a range from 0.2 to 0.4 g/ml, and preferably from 0.25 to 0.35 g/ml, and even more preferably from 0.28 to 0.29 g/ml. If this bulk density is less than 0.2 g/ml, then the fine particles are increasingly likely to undergo scattering or adhesion, causing a deterioration in the cleanability, whereas if the bulk density exceeds 0.4 g/ml, then the flowability deteriorates.

The particle diameter of the above particles is typically within a range from 0.01 to 5 μm, and preferably from 0.05 to 0.5 μm, and even more preferably from 0.1 to 0.2 μm. If the particle diameter is smaller than 0.01 μm, then the particles tend to aggregate, resulting in unsatisfactory levels of flowability, caking resistance and fixation for the developer, whereas if the particle diameter exceeds 5 μm, then other problems arise including degeneration or scratching of the photoreceptor, and a deterioration in the adhesion of the fine particles to the toner.

<Toner External Additive comprising Spherical Silica-Titania-based Fine Particles Surface-Treated with Silane>

Spherical silica-titania-based fine particles that have been surface-treated with silane according to the present invention can be used as a toner external additive. The quantity of this toner external additive comprising the above fine particles (hereafter, may also be referred to as simply "the fine particles") added to a toner is typically within a range from 0.01 to 30 parts by weight, and preferably from 0.1 to 20 parts by weight, and even more preferably from 1 to 3 parts by weight, per 100 parts by weight of the toner. If the quantity added is too small, then the degree of adhesion to the toner is inadequate resulting in an unsatisfactory level of flowability, whereas if the quantity is too large, then not only can the additive have a deleterious effect on the chargeability of the toner, but the product also becomes economically unviable.

The above fine particles may merely mechanically or weakly adhere to the surface of the toner particles. Furthermore, the bonded fine particles may cover the entire surface of the toner particles, or may cover only a portion of the toner particles. In addition, a portion of the above fine particles may form an aggregate, which then covers the surface of the toner particles, although the toner particles are preferably covered with a single layer of fine particles.

Examples of the types of toner particles that are suitable for use with the fine particles of the present invention include conventional toner particles comprising a binder resin and a colorant as the primary components, and where necessary also containing an added charge control agent.

A toner added with a toner external additive comprising fine particles of the present invention is used, for example, in electrostatically charged image development in electrophotographic techniques or electrostatic recording techniques. This toner can either be used as a one-component developer, or can be mixed with a carrier and used as a two-component developer. In those cases where the toner is used in a two-component developer, the toner external additive need not necessarily be added in advance to the toner particles, any may be added during the mixing of the toner and the carrier in order to cover the surface of the toner. Examples of suitable carriers include conventional materials such as ferrite and iron powder, or products produced by forming a resin coating on the surface of these materials.

EXAMPLES

As follows is a description of specifics of the present invention, using a series of Examples and Comparative Examples. Examples described below in no way restrict the present invention.

Example 1

[Synthesis of Spherical Silica-Titania-based Fine Particles Surface-Treated with Silane]

(I) Synthesis of Hydrophilic Spherical Silica-Titania Fine Particles

A 5 liter glass reaction vessel equipped with a stirrer, a dropping funnel and a thermometer was charged with 997.9 g of methanol, 66.2 g of water and 79.7 g of 28% aqueous ammonia, and the resulting mixture was stirred. The temperature of the solution was adjusted to 35° C., and with constant stirring, addition of both a mixture of 1861.9 g of tetramethoxysilane and 3.7 g of titanium tetraisopropoxide, and 668.9 g of 5.4% aqueous ammonia were commenced simultaneously. The mixture of tetramethoxysilane and titanium tetraisopropoxide was added dropwise over a period of 6 hours, and the aqueous ammonia was added dropwise over a period of 4 hours. Following completion of these additions, stirring was continued for a further 0.5 hours to allow the hydrolysis to proceed, yielding a suspension of hydrophilic spherical silica-titania fine particles. Subsequently, an ester adapter and a condenser were attached to the glass reaction vessel, the suspension was heated to 60 to 70° C. while 1932 g of methanol were distilled off, and 1920 g of water was then added. Subsequently, the suspension was heated once again to 70 to 90° C. while a further 823 g of methanol were distilled off, thereby yielding an aqueous suspension of the hydrophilic spherical silica-titania fine particles.

(II) Surface Hydrophobization of Hydrophilic Spherical Silica-Titania Fine Particles (Step (A))

18.6 g of methyltrimethoxysilane (equivalent to 0.01 mols per 1 mol of tetramethoxysilane) was added dropwise to the above aqueous suspension at room temperature over a period of 0.5 hours, and following completion of the addition, stirring was continued for a further 12 hours, thereby effecting a hydrophobization of the surface of the silica-titania fine particles and producing an aqueous dispersion of hydrophobic spherical silica-titania fine particles.

(III) Surface Triorganosilylation of Hydrophobic Spherical Silica-Titania Fine Particles (Step (B))

Following the addition of 2310 g of methyl isobutyl ketone to the aqueous dispersion produced in the step (II) described above, the resulting dispersion was heated at 80 to 110° C., and 2083 g of a methanol and water mixture were distilled off over a period of 7 hours. The resulting dispersion was cooled to room temperature, 240 g of hexamethyldisilazane was added, and the silica-titania fine particles within the dispersion were subjected to trimethylsilylation by heating the dispersion to 120° C. and allowing the reaction to proceed for 3 hours. Subsequently, the solvent was distilled off from the dispersion under reduced pressure, yielding 763 g of spherical silica-titania-based fine particles surface-treated with silane.

The properties of the spherical silica-titania-based fine particles that had undergone surface treatment with silane, produced according to the steps (I) to (III) described above, were measured in accordance with the measurement methods 1 to 5 described below. The results are shown in Table 1.

[Measurement Methods 1 to 5]

1. Measurement of Titanium Content within Spherical Silica-Titania-based Fine Particles Surface-Treated with Silane This property was determined by fluorescent X-ray analysis.

2. Measurement of Electrostatic Charge of Spherical Silica-Titania-based Fine Particles Surface-Treated with Silane The silica-titania fine particles were added to a ferrite carrier (brand name: FL100, manufactured by Powdertech Corporation) in sufficient quantity to generate a concentration of 1% by weight, and the resulting mixture was mixed for 10 minutes in a shaker to effect frictional electrification. Using a 0.2 g sample of this mixture, the electrostatic charge was measured using a blow-off powder charge measuring device (brand name: TB-200, manufactured by Toshiba Chemical Co., Ltd., nitrogen blow pressure: 4.9 N/m$^2$, nitrogen blow time: 60 seconds)

3. Measurement of Bulk Density of Spherical Silica-Titania-based Fine Particles Surface-Treated with Silane This property was measured using a powder tester (brand name: PT-R, manufactured by Hosokawa Micron Corporation, 60 mesh, 25 cc cup).

4. Measurement of Particle Diameter of Spherical Silica-Titania-based Fine Particles Surface-Treated with Silane The silica-titania fine particles were added to methanol in sufficient quantity to generate a concentration of 0.5% by weight, and the particles were then dispersed by irradiation with ultrasound for 10 minutes. The particle size distribution of the thus treated fine particles was measured using a laser diffraction scattering type particle size distribution measuring device (brand name: LA910, manufactured by Horiba Ltd.), and the median was recorded as the particle diameter.

5. Measurement of the Shape of Spherical Silica-Titania-based Fine Particles Surface-Treated with Silane The particle shape was ascertained by inspection under an electron microscope (brand name: S-4700, manufactured by Hitachi Ltd., magnification 100,000×).

[Preparation of an External Additive Mixed Toner]

96 parts by weight of a polyester resin with a glass transition temperature $T_g$ of 60° C. and a softening point of 110° C., and 4 parts by weight of a colorant Carmin 6BC (manufactured by Sumika Color Co., Ltd.) were melted and kneaded together, and then crushed and classified to produce a toner with an average particle diameter of 7 μm. 40 g of this toner was then mixed with 1 g of the aforementioned surface-treated spherical hydrophobic silica fine particles using a sample mill to form an external additive mixed toner. Using this toner, the degree of toner aggregation was measured in accordance with a measurement method 6 described below. The result is shown in Table 1.

[Measurement Method 6]

6. Measurement of Degree of Toner Aggregation

The degree of aggregation is a value that indicates the flowability of a powder, and is measured using a powder tester (manufactured by Hosokawa Micron Corporation) and a three stage sieve comprising 200, 100 and 60 mesh sieves superimposed in this order. In this measurement method, 5 g of the toner powder was placed on top of the 60 mesh sieve belonging to the top stage of the three stage sieve, and a voltage of 2.5 V was then applied to the powder tester, and the three stage sieve was oscillated for 15 seconds. Subsequently, the weight a (g) of powder remaining on the 60 mesh sieve, the weight b (g) of powder remaining on the 100 mesh sieve, and the weight c (g) of powder remaining on the 200 mesh sieve were each measured. From these measured values, the degree of aggregation was calculated using the formula shown below. As the degree of aggregation decreases the flowability of the toner improves, whereas as the degree of aggregation increases the flowability worsens.

Degree of aggregation (%)=($a+b \times 0.6+c \times 0.2$)×100/5

[Preparation of a Developer]

5 parts of an external additive mixed toner and 95 parts of a carrier comprising a ferrite core with an average particle diameter of 85 μm coated with a polymer consisting of a polyblend of a perfluoroalkyl acrylate resin and an acrylic resin were mixed together to form a developer. Using this developer, the toner electrostatic charge and the degree of toner adhesion to a photoreceptor were measured in accordance with measurement methods 7 and 8 described below. The results are shown in Table 1.

[Measurement Methods 7 and 8]

7. Measurement of Toner Electrostatic Charge

The developer described above was stored for 1 day under either high temperature, high humidity conditions (30° C., 90% RH) or low temperature, low humidity conditions (10° C., 15% RH), and was then mixed for 30 seconds in a shaker, before the frictional electrification was measured. The electrostatic charge of each sample was measured under identical conditions, using a blow-off powder charge measuring device (brand name: TB-200, manufactured by Toshiba Chemical Co., Ltd.).

8. Measurement of Toner Adhesion to a Photoreceptor

The developer described above was placed in a two-component improved developing device equipped with an organic photoreceptor, and a print test of 30,000 pages was conducted. Toner adhesion to the photoreceptor was detected as unprinted white sections within solid print images. The number of these unprinted white sections was counted, and 10 or more sections/cm$^2$ was reported as "numerous", from 1 to 9 sections/cm$^2$ was reported as "few", and 0 sections/cm$^2$ was reported as "none".

[Measurement Method 9]

9. Measurement of Image Density

The developer described above was placed in a two-component improved developing device equipped with an organic photoreceptor, and square solid print images measuring 5 mm×5 mm were printed out on standard copying papers (75 g/m$^2$) under either high temperature, high humidity conditions (30° C., 90% RH) or low temperature, low humidity conditions (10° C., 15% RH). The relative image densities of the solid print images were measured using Macbeth Reflective Densitometer RD 918 (manufactured by Macbeth AG), based on the image density of 0.00 of white sections. The results are shown in Table 1. The values of the relative image densities were classified as follows:

A: 1.40 or more

B: 1.25 or more, but less than 1.40

C: 1.00 or more, but less than 1.25

D: less than 1.00

[Measurement Method 10]

10. Measurement of Image Quality of Highlight Parts

The developer described above was placed in a two-component improved developing device equipped with an organic photoreceptor, and images with an image density of 0.3 to 0.6 measured using the Macbeth Reflective Densitometer were printed out under either high temperature, high humidity conditions (30° C., 90% RH) or low temperature, low humidity conditions (10° C., 15% RH). The uniformity of the image density was measured by eye observation and evaluated as the image quality of highlight parts. The results are shown in Table 1. The degree of the uniformity was classified as follows:

⊚: Excellent uniformity of the image density was observed in the printed-out image.

○: Slightly poor uniformity of the image density was observed in the printed-out image, but the developer can be applied to practical use.

Δ: Poor uniformity of the image density was observed in the printed-out image, and the developer is difficult to apply to practical use.

X: Remarkably poor uniformity of the image density was observed in the printed-out image.

Example 2

With the exception of altering the quantity of titanium tetraisopropoxide used in step (I) to 37.0 g, reaction was conducted in the same manner as Example 1, and yielded 778 g of spherical silica-titania-based fine particles surface-treated with silane. The properties of these spherical silica-titania-based fine particles that had undergone surface treatment with silane were measured in the same manner as Example 1. The results are shown in Table 1.

Comparative Example 1

With the exception of not using any titanium tetraisopropoxide in step (I), reaction was conducted in the same manner as Example 1, and yielded 720 g of spherical silica-based fine particles surface-treated with silane. The properties of these spherical silica-titania-based fine particles surface-treated with silane were measured in the same manner as Example 1. The results are shown in Table 1.

Comparative Example 2

With the exception of altering the quantity of titanium tetraisopropoxide used in step (I) of Example 1 to 279.3 g, step (I) and step (II) were conducted in the same manner as Example 1. The aqueous dispersion produced in step (II) was then supplied to step (III), 2310 g of methyl isobutyl ketone was added, and the resulting dispersion was heated at 80 to 110° C., but following distillation of 204 g of a methanol and water mixture over a period of 1 hour, the dispersion of hydrophobic spherical silica-titania fine particles aggregated. The results are shown in Table 1.

Comparative Example 3

Step (II) of Example 1, in which the silica-titania fine particles undergo surface hydrophobization using methyltrimethoxysilane, was omitted, and the aqueous suspension of hydrophilic spherical silica-titania fine particles produced in step (I) was supplied directly to step (III), 2310 g of methyl isobutyl ketone was added and the resulting dispersion was heated at 80 to 110° C., but following distillation of 458 g of a methanol and water mixture over a period of 3 hours, the dispersion of hydrophilic spherical silica-titania fine particles aggregated. The results are shown in Table 1.

Comparative Example 4

From the aqueous suspension of hydrophilic spherical silica-titania fine particles produced in step (I) of Example 1, 2,705 g of a methanol and water mixture were distilled off over a period of 5 hours, and the suspension was then dried under reduced pressure at 80° C., yielding 725 g of hydrophilic spherical silica-titania fine particles. The properties of these hydrophilic spherical silica-titania fine particles were then measured in the same manner as Example 1. The results are shown in Table 1.

Comparative Example 5

To the aqueous suspension of hydrophilic spherical silica-titania fine particles produced in step (I) of Example 1, 240 g of hexamethyldisilazane was added at room temperature, and the silica-titania fine particles within the suspension were subjected to trimethylsilylation by heating at 120° C. and allowing the reaction to proceed for 3 hours. Subsequently, a methanol and water mixture was distilled off under reduced pressure at 80° C., yielding 754 g of spherical silica-titania-based fine particles surface-treated with silane. The properties of these spherical silica-titania-based fine particles that had been surface-treated with silane were then evaluated in the same manner as Example 1. The results are shown in Table 1.

<Evaluation>

When a series of steps for synthesizing spherical silica-titania-based fine particles surface-treated with silane are conducted so as to satisfy certain predetermined conditions, as in the case of Examples 1 and 2, the thus produced spherical silica-titania-based fine particles surface-treated with silane satisfy the conditions of the present invention. When the measurements described above are conducted using these particles, the results reveal good resistance to aggregation, good dispersibility, a toner electrostatic charge that is unaffected by the environmental conditions, and good prevention of toner adhesion, and degeneration or scratching of the photoreceptor.

If titanium tetraisopropoxide is not used in step (I), as in Comparative Example 1, then the thus produced spherical silica-titania-based fine particles surface-treated with silane do not satisfy the conditions of the present invention in terms of titanium atom content, frictional electrification and bulk density. When the measurements described above are conducted using these fine particles, the results reveal a toner that is resistant to aggregation, but which displays a toner electrostatic charge that is easily affected by the environmental conditions, and which also shows some toner adhesion, and degeneration and scratching of the photoreceptor, meaning the toner is not particularly desirable.

TABLE 1

| | Example 1 | Example 2 | Comparative Example 1 | Comparative Example 2 | Comparative Example 3 | Comparative Example 4 | Comparative Example 5 |
|---|---|---|---|---|---|---|---|
| Titanium content (% by weight) | 0.07 | 0.7 | 0 | 5.8 | — | 0.07 | 0.07 |
| Frictional electrification (μC/g) | −140 | −180 | −60 | — | — | −350 | −40 |
| Bulk density (g/ml) | 0.29 | 0.28 | 0.41 | — | — | 0.18 | 0.47 |
| Particle diameter (μm) | 0.12 | 0.12 | 0.11 | (aggregate) | (aggregate) | 11 (aggregate) | 0.12 |
| Shape | spherical | spherical | spherical | — | — | spherical | spherical |
| Degree of aggregation | 3 | 3 | 3 | — | — | 72 | 6 |
| Electrostatic charge for toner under high temperature, high humidity (μC/g) | −27 | −35 | −20 | — | — | −23 | −18 |
| Electrostatic charge for toner under low temperature, low humidity (μC/g) | −30 | −39 | −26 | — | — | −49 | −29 |
| Toner adhesion | none | none | few | — | — | numerous | few |
| Relative image density under high temperature, high humidity | A | A | C | — | — | D | D |
| Relative image density under low temperature, low humidity | A | A | B | — | — | D | B |
| Image quality of highlight parts printed out under high temperature, high humidity | ◎ | ◎ | ○ | — | — | Δ | Δ |
| Image quality of highlight parts printed out under low temperature, low humidity | ◎ | ◎ | Δ | — | — | x | Δ |

If the quantity of titanium tetraisopropoxide is increased markedly in step (I), as in Comparative Example 2, then during distillation of the methanol and water mixture, the dispersion of the hydrophobic spherical silica-titania fine particles aggregates, which is undesirable.

If the step (II) for conducting a hydrophobization of the surface of the hydrophilic spherical silica-titania fine particles is omitted, as in Comparative Example 3, then during distillation of the methanol and water mixture, the dispersion of the hydrophilic spherical silica-titania fine particles aggregates, which is undesirable.

If hydrophilic spherical silica-titania fine particles produced by distilling a methanol and water mixture off from the aqueous suspension of hydrophilic spherical silica-titania fine particles produced in the step (I) are used, as in Comparative Example 4, then the particles do not satisfy the conditions of the present invention in terms of frictional electrification, bulk density and particle diameter, and some aggregation of the fine particles is also observed. When the measurements described above are conducted using these fine particles, then not only does the toner aggregate, but the toner electrostatic charge is poor under conditions of high temperature and high humidity, and some toner adhesion, and degeneration and scratching of the photoreceptor is also observed, meaning the toner is not particularly desirable.

If the aqueous suspension of hydrophilic spherical silica-titania fine particles produced in step (I) is supplied directly to step (III), as in Comparative Example 5, then the thus produced spherical silica-titania-based fine particles surface-treated with silane do not satisfy the conditions of the present invention in terms of frictional electrification and bulk density. When the measurements described above are conducted using these fine particles, the toner electrostatic charge is poor under conditions of high temperature and high humidity, and some toner adhesion together with some degeneration and scratching of the photoreceptor is also observed, meaning the toner is not particularly desirable.

What is claimed is:

1. Spherical silica-titania-based fine particles surface-treated with silane, wherein a titanium atom content is within a range from 0.001 to 5% by weight, frictional electrification with iron powder is within a range from $-100$ to $-300$ μC/g, bulk density is within a range from 0.2 to 0.4 g/ml, and particle diameter is within a range from 0.01 to 5 μm.

2. A production process for the spherical silica-titania-based fine particles surface-treated with silane according to claim 1, comprising the steps of
   (A) producing hydrophobic spherical silica-titania fine particles by introducing $R^5SiO_{3/2}$ units [wherein, $R^5$ represents a substituted or unsubstituted monovalent hydrocarbon group of 1 to 20 carbon atoms] onto a surface of hydrophilic spherical silica-titania fine particles comprising $SiO_2$ units and $TiO_2$ units, and
   (B) introducing $R^7_3SiO_{1/2}$ units [wherein, said $R^7$ groups are either identical or different, and each represent a substituted or unsubstituted monovalent hydrocarbon group of 1 to 6 carbon atoms] onto a surface of said hydrophobic spherical silica-titania fine particles.

3. The production process according to claim 2, wherein said hydrophilic spherical silica-titania fine particles used in said step (A) are produced by a process that comprises a step for hydrolyzing and condensing a mixture of:
   a tetrafunctional silane compound represented by a general formula (1):

$$Si(OR^1)_4 \qquad (1)$$

[wherein, said $R^1$ groups are either identical or different, and each represent a monovalent hydrocarbon group of 1 to 6 carbon atoms], or a partial hydrolysis-condensation product thereof, or a mixture of the two; and
   a tetrafunctional titanium compound represented by a general formula (2):

$$TiR^3_p(OR^2)_{4-p} \qquad (2)$$

[wherein, said $R^2$ groups are either identical or different, and each represent a monovalent hydrocarbon group of 1 to 20 carbon atoms, $R^3$ is either an enol residue of a β-diketone represented by a general formula (2-a):

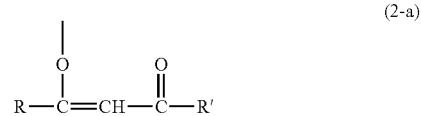

(2-a)

(wherein, R and R' are either identical or different, and each represent a monovalent hydrocarbon group of 1 to 6 carbon atoms), or an enol residue of a β-ketoester represented by a general formula (2-b):

(2-b)

(wherein, R and R' are either identical or different, and are each as defined above), and p is an integer of 0 to 2] in a mixed liquid of water and a hydrophilic organic solvent in the presence of a basic material, thereby generating said hydrophilic spherical silica-titania fine particles.

4. The production process according to claim 3, wherein said tetrafunctional silane compound represented by the general formula (1) is selected from the group consisting of tetramethoxysilane, tetraethoxysilane, tetraisopropoxysilane, tetrabutoxysilane, and tetraphenoxysilane.

5. The production process according to claim 3, wherein said tetrafunctional titanium compound represented by the general formula (2) is selected from the group consisting of titanium tetraisopropoxide, titanium tetrabutoxide, titanium tetrakis(2-ethylhexyloxide), titanium tetranonyloxide, titanium tetrastearyloxide, titanium tetraisopropenoxide, titanium diisopropoxide bis(2,4-pentanedionate), titanium dibutoxide bis(2,4-pentanedionate), titanium diisopropoxide bis(2,2,6,6-tetramethyl-3,5-heptanedionate), and titanium diisopropoxide bis(ethylacetoacetate).

6. The production process according to claim 3, wherein said hydrophilic organic solvent is an alcohol solvent represented by a general formula (3):

$$R^4OH \qquad (3)$$

[wherein, $R^4$ is a monovalent hydrocarbon group of 1 to 6 carbon atoms].

7. The production process according to claims 3, wherein said basic material is ammonia.

8. The production process according to claims 3, wherein the quantity of water used is within a range from 0.5 to 5 mols per 1 mol of alkoxy groups within the tetrafunctional silane compound of the general formula (1) or the partial hydrolysis-condensation product thereof and the tetrafunctional titanium compound of the general formula (2), and the ratio between the water and the hydrophilic organic solvent is a weight ratio within a range from 0.5 to 10.

9. The production process according to claims 3, wherein the quantity of the basic material is within a range from 0.01 to 5 mols per 1 mol of alkoxy groups within the silane compound of the general formula (1) or the partial hydrolysis-condensation product thereof and the compound of the general formula (2).

10. The production process according to claims 2, wherein in said step (A), a trifunctional silane compound represented by a general formula (4):

$$R^5Si(OR^6)_3 \qquad (4)$$

[wherein $R^5$ is a substituted or unsubstituted monovalent hydrocarbon group of 1 to 20 carbon atoms, and said $R^6$ groups are either identical or different, and each represent a monovalent hydrocarbon group of 1 to 6 carbon atoms], or a partial hydrolysis-condensation product thereof, or a mixture of the two is added to either an aqueous dispersion, or a mixed solvent dispersion of water and a hydrophilic organic solvent in the presence of said hydrophilic spherical silica-titania fine particles, thereby treating a surface of said hydrophilic spherical silica-titania fine particles and generating hydrophobic spherical silica-titania fine particles.

11. The production process according to claim 10, wherein the trifunctional silane compound represented by the general formula (4) is selected from the group consisting of methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, trifluoropropyltrimethoxysilane and heptadecafluorodecyltrimethoxysilane, and a partial hydrolysis-condensation product of these compounds.

12. The production process according to claim 10, wherein the quantity of the trifunctional silane compound represented by the general formula (4) is within a range from 0.001 to 1 mol per 1 mol of combined $SiO_2$ units and $TiO_2$ units within the hydrophilic spherical silica-titania fine particles.

13. The production process according to claim 10, wherein in said step (B), a dispersion medium of said aqueous dispersion comprising hydrophobic spherical silica-titania fine particles is replaced with a ketone-based solvent, thereby generating a ketone-based solvent dispersion comprising said hydrophobic spherical silica-titania fine particles, and either a silazane compound represented by a general formula (5):

$$R^7_3SiNHSiR^7_3 \qquad (5)$$

[wherein, said $R^7$ groups are either identical or different, and each represent a substituted or unsubstituted monovalent hydrocarbon group of 1 to 6 carbon atoms], a monofunctional silane compound represented by a general formula (6):

$$R^7_3SiX \qquad (6)$$

[wherein, said $R^7$ groups are either identical or different and are as defined above, and X represents either an OH group or a hydrolysable group], or a mixture of the two is added to said ketone-based solvent dispersion comprising said hydrophobic spherical silica-titania fine particles, thereby triorganosilylating residual reactive groups at a surface of said hydrophobic spherical silica-titania fine particles.

14. The production process according to claim 13, wherein the quantity of the ketone-based solvent, reported as a weight ratio relative to the quantity of hydrophilic spherical silica-titania fine particles used, is within a range from 0.5 to 5.

15. The production process according to claim 13, wherein said ketone-based solvent is methyl isobutyl ketone.

16. The production process according to claim 13, wherein the silazane compound represented by the general formula (5) is present and is hexamethyldisilazane or hexaethyldisilazane.

17. The production process according to claim 13, wherein the monofunctional silane compound represented by the general formula (6) is present and is selected from the group consisting of trimethylsilanol, triethylsilanol, trimethylchlorosilane, triethylchlorosilane, trimethylmethoxysilane, trimethylethoxysilane, trimethylsilyldimethylamine, trimethylsilyldiethylamine, and trimethylacetoxysilane.

18. The production process according to claim 13, wherein the quantity of the silazane compound, the monofunctional silane compound, or a mixture of the two is within a range from 0.1 to 0.5 mols per 1 mol of combined $SiO_2$ units and $TiO_2$ units within the hydrophilic spherical silica-titania fine particles.

19. An external additive for an electrostatically charged image developing toner comprising the spherical silica-titania-based fine particles surface-treated with silane according to claim 1.

20. An electrostatically charged image developing toner comprising the external additive according to claim 19, wherein the quantity of the external additive added to the toner is within a range from 0.01 to 30 parts by weight per 100 parts by weight of the toner.

* * * * *